(12) United States Patent
Pelkey et al.

(10) Patent No.: US 8,851,331 B2
(45) Date of Patent: Oct. 7, 2014

(54) FLUID DISPENSERS WITH ADJUSTABLE DOSING

(71) Applicant: Ecolab USA Inc., St. Paul, MN (US)

(72) Inventors: John T. Pelkey, St. Paul, MN (US);
Brian P. Carlson, Lakeville, MN (US);
Troy A. Anderson, Eagan, MN (US);
Brian K. Stahel, New Brighton, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 13/869,205

(22) Filed: Apr. 24, 2013

(65) Prior Publication Data

US 2013/0292410 A1    Nov. 7, 2013

Related U.S. Application Data

(60) Provisional application No. 61/642,928, filed on May 4, 2012.

(51) Int. Cl.
*B67D 7/06* (2010.01)
*A47K 5/12* (2006.01)

(52) U.S. Cl.
CPC .................................. *A47K 5/1202* (2013.01)
USPC ........ 222/181.3; 222/182; 222/285; 222/289; 222/309; 222/321.8; 222/383.1; 417/419

(58) Field of Classification Search
USPC ........... 417/419; 221/241; 222/14–23, 52, 63, 222/163, 181.3, 182, 282, 285, 287–289, 222/309, 321.6–321.8, 383.1, 383.3
See application file for complete search history.

(56) References Cited

U.S. PATENT DOCUMENTS

| 3,458,090 | A | * | 7/1969  | Scoggin, Jr. | 222/309 |
| 4,084,729 | A | * | 4/1978  | Epple        | 222/307 |
| 4,921,150 | A |   | 5/1990  | Lagergren et al. | |
| 5,033,657 | A | * | 7/1991  | Whittington  | 222/309 |
| 5,156,293 | A |   | 10/1992 | Petterson et al. | |

(Continued)

FOREIGN PATENT DOCUMENTS

| EP | 1454576  | A2 | 9/2004 |
| EP | 20055871 | A2 | 12/2008 |

(Continued)

OTHER PUBLICATIONS

International Search Report and Written Opinion for corresponding international application No. PCT/US2013/038823, dated Aug. 12, 2013, 10 pp.

(Continued)

*Primary Examiner* — Paul R Durand
*Assistant Examiner* — Andrew P Bainbridge
(74) *Attorney, Agent, or Firm* — Shumaker & Sieffert, P.A.

(57) ABSTRACT

A fluid dispenser includes an adjustable dosing mechanism that permits adjustment of the amount of fluid to be dispensed. An adjustable dosing mechanism may be inserted into the dispenser in either a high dose orientation or a low dose orientation. The body further includes pair of dose adjusting flanges. When the adjustable dosing mechanism body is received into the dispenser in the high dose orientation, a relatively larger quantity of fluid product is dispensed. When the adjustable dosing mechanism body is received into the dispenser in the low dose orientation, a relatively smaller quantity of fluid product is dispensed.

20 Claims, 9 Drawing Sheets

(56) References Cited

U.S. PATENT DOCUMENTS

| | | | |
|---|---|---|---|
| 5,373,970 A | 12/1994 | Ophardt | |
| 5,431,309 A * | 7/1995 | Ophardt | 222/181.3 |
| 5,445,288 A | 8/1995 | Banks | |
| 5,465,877 A * | 11/1995 | Bell et al. | 222/181.2 |
| 5,492,247 A | 2/1996 | Shu et al. | |
| 5,836,482 A | 11/1998 | Ophardt et al. | |
| 5,992,698 A | 11/1999 | Copeland et al. | |
| 6,036,056 A | 3/2000 | Lee et al. | |
| 6,082,586 A | 7/2000 | Banks | |
| 6,189,740 B1 | 2/2001 | Wade et al. | |
| 6,209,752 B1 | 4/2001 | Mitchell et al. | |
| 6,347,724 B1 | 2/2002 | Chen et al. | |
| 6,607,103 B2 * | 8/2003 | Gerenraich et al. | 222/183 |
| 6,619,512 B1 | 9/2003 | Sayers et al. | |
| 6,701,573 B1 | 3/2004 | Ciavarella et al. | |
| 6,772,328 B1 | 8/2004 | Talbot et al. | |
| 6,877,642 B1 | 4/2005 | Maddox et al. | |
| 7,044,328 B1 | 5/2006 | Ciavarella | |
| 7,066,356 B2 | 6/2006 | Schuman et al. | |
| 7,084,592 B2 | 8/2006 | Rodrian | |
| 7,232,045 B2 | 6/2007 | Ophardt et al. | |
| 7,247,140 B2 | 7/2007 | Ophardt | |
| 7,278,554 B2 | 10/2007 | Armstrong | |
| 7,296,765 B2 | 11/2007 | Rodrian | |
| 7,367,477 B2 | 5/2008 | Ophardt et al. | |
| 7,530,477 B2 | 5/2009 | Ophardt | |
| 7,540,397 B2 | 6/2009 | Muderlak et al. | |
| 7,568,598 B2 | 8/2009 | Ophardt et al. | |
| 7,611,030 B2 | 11/2009 | Reynolds et al. | |
| 7,637,391 B2 | 12/2009 | Rosenkranz et al. | |
| 7,748,574 B2 | 7/2010 | Ophardt et al. | |
| 7,765,916 B2 | 8/2010 | Ophardt et al. | |
| 7,798,370 B2 | 9/2010 | Ciavarella et al. | |
| 7,798,371 B2 | 9/2010 | Ophardt | |
| 7,896,196 B2 * | 3/2011 | Wegelin et al. | 222/52 |
| 7,909,209 B2 | 3/2011 | Reynolds et al. | |
| 2003/0141318 A1 | 7/2003 | Sorensen et al. | |
| 2004/0232168 A1* | 11/2004 | Ciavarella et al. | 222/156 |
| 2005/0064281 A1 | 3/2005 | Ophardt | |
| 2005/0072808 A1* | 4/2005 | Kitamura | 222/309 |
| 2005/0263545 A1 | 12/2005 | Ophardt | |
| 2005/0284888 A1 | 12/2005 | Rhodenbaugh et al. | |
| 2006/0032871 A1 | 2/2006 | Ophardt et al. | |
| 2006/0041197 A1 | 2/2006 | Ophardt | |
| 2006/0175353 A1 | 8/2006 | Ophardt et al. | |
| 2006/0213929 A1 | 9/2006 | Ophardt et al. | |
| 2007/0000941 A1 | 1/2007 | Hadden et al. | |
| 2007/0158359 A1 | 7/2007 | Rodrian | |
| 2007/0169576 A1 | 7/2007 | Ophardt et al. | |
| 2007/0257058 A1 | 11/2007 | Ophardt et al. | |
| 2008/0121659 A1 | 5/2008 | Ophardt | |
| 2008/0185399 A1 | 8/2008 | Yang et al. | |
| 2008/0283556 A1 | 11/2008 | Snodgrass et al. | |
| 2009/0045221 A1 | 2/2009 | Ophardt et al. | |
| 2009/0101671 A1 | 4/2009 | Cittadino et al. | |
| 2009/0120950 A1 | 5/2009 | Titas et al. | |
| 2009/0184137 A1 | 7/2009 | O'Brien | |
| 2009/0204256 A1 | 8/2009 | Wegelin | |
| 2009/0266842 A1 | 10/2009 | Snodgrass | |
| 2009/0302061 A1 | 12/2009 | Ophardt | |
| 2009/0302067 A1 | 12/2009 | Hendrickx et al. | |
| 2009/0308887 A1 | 12/2009 | Woo et al. | |
| 2010/0012679 A1 | 1/2010 | Brownlee | |
| 2010/0059550 A1 | 3/2010 | Ciavarella et al. | |
| 2010/0072227 A1 | 3/2010 | Cittadino et al. | |
| 2010/0140297 A1* | 6/2010 | Ophardt et al. | 222/181.3 |
| 2010/0147890 A1 | 6/2010 | Ciavarella | |
| 2010/0163580 A1 | 7/2010 | Ophardt et al. | |
| 2010/0206909 A1 | 8/2010 | O'Brien | |
| 2010/0237096 A1 | 9/2010 | Wegelin | |
| 2010/0252568 A1 | 10/2010 | Ciavarella et al. | |
| 2010/0288788 A1 | 11/2010 | Ophardt | |
| 2010/0308076 A1 | 12/2010 | Snodgrass | |
| 2010/0320227 A1 | 12/2010 | Reynolds | |
| 2011/0011890 A1 | 1/2011 | Rosenkranz et al. | |
| 2011/0017778 A1* | 1/2011 | Kadiks et al. | 222/190 |
| 2011/0056987 A1 | 3/2011 | Proper et al. | |
| 2011/0062182 A1 | 3/2011 | Reynolds | |
| 2011/0101032 A1 | 5/2011 | Hsu | |

FOREIGN PATENT DOCUMENTS

| | | |
|---|---|---|
| WO | 2004876731 A2 | 10/2004 |
| WO | 2008006209 A2 | 1/2008 |
| WO | 2011077111 A1 | 6/2011 |

OTHER PUBLICATIONS

U.S. Appl. No. 13/769,155, by John T. Pelkey, filed Feb. 15, 2013.
U.S. Appl. No. 13/768,110, by John T. Pelkey, filed Feb. 15, 2013.
U.S. Appl. No. 13/868,645, by John T. Pelkey, filed Apr. 23, 2013.

* cited by examiner

FLUID DISPENSERS WITH ADJUSTABLE DOSING

This application claims the benefit of U.S. Provisional Application No. 61/642,928, filed May 4, 2012, which is incorporated herein by reference in its entirety.

TECHNICAL FIELD

The disclosure relates to fluid dispensers.

BACKGROUND

Hand washing is important in many industries, including hospitality (hotels, restaurants, etc.) and healthcare (hospitals, nursing homes, etc.). In addition, there are many other applications in which the dispensing of various fluids occurs. To facilitate hand washing, for example, fluid dispensers that dispense hand cleansing products may be placed near sinks of a kitchen or washroom for the washing of hands by employees or patrons of an establishment, employees, patients, or visitors to a healthcare facility, or other persons. Such fluid dispensers house a disposable or refillable product container, such as a cartridge or flexible bag, containing a supply of the desired fluid product. The fluid may include, for example, foams, liquids, and/or gels. The dispensers are generally wall mounted and include a hinged cover which permits opening and closing of the dispenser housing so that the supply of fluid product may be refilled or replaced. Some fluid dispensers are manually actuated by pushing or pulling a handle, bar, or button on the dispenser. Others dispense automatically by sensing presence of a user or the user's hands near the dispenser.

SUMMARY

In general, the disclosure relates to fluid dispensers with adjustable dosing.

In one example, the disclosure is directed to a dispenser comprising a housing, a container inside of the housing having a supply of fluid to be dispensed, a dispensing actuator that when actuated by a user results in a quantity of the fluid being dispensed from the container, an adjustable dosing mechanism body comprising a high dose surface, a low dose surface, an inner edge and an outer edge, the body further including one or more dose adjusting flanges positioned relatively nearer the low dose surface than the high dose surface, and the housing further including an adjustable dosing mechanism receiving area positioned inside of the housing and sized to receive the adjustable dosing mechanism body in either a high dose orientation or a low dose orientation, such that when the adjustable dosing mechanism body is received into the adjustable dosing mechanism receiving area in the high dose orientation, a relatively larger quantity of fluid product is drawn into a pump for subsequent dispensing, and when the adjustable dosing mechanism body is received into the adjustable dosing mechanism receiving area in the low dose orientation, a relatively smaller quantity of fluid product is drawn into the pump for subsequent dispensing.

The details of one or more examples are set forth in the accompanying drawings and the description below. Other features and advantages will be apparent from the description and drawings, and from the claims.

DETAILED DESCRIPTION

Figure 1:
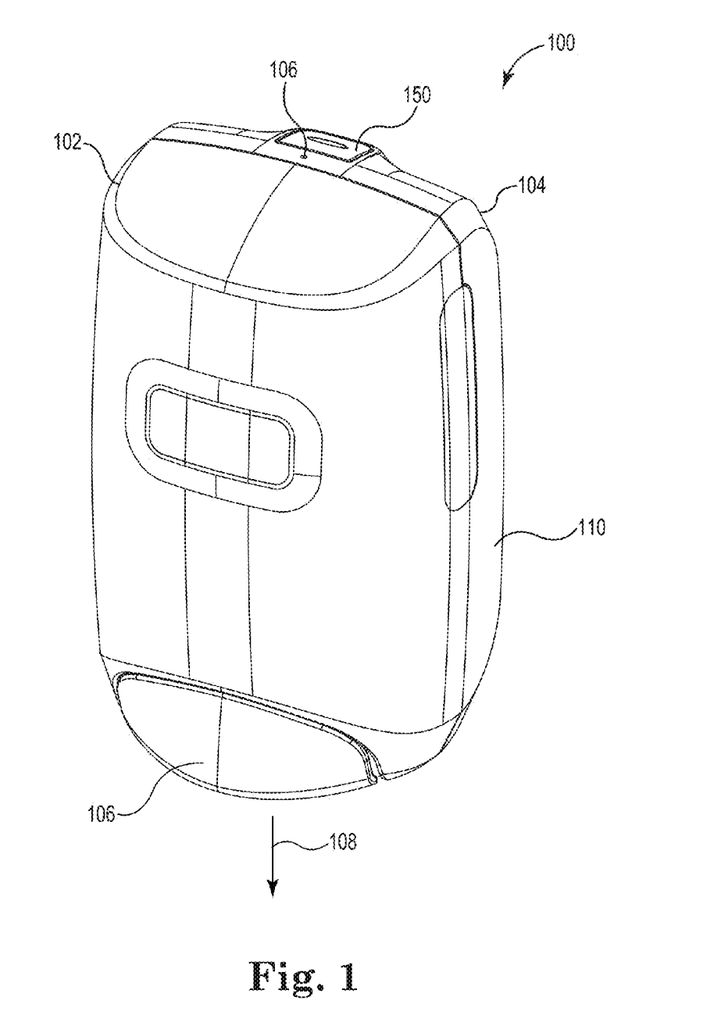
FIG. 1 is a block diagram illustrating an example fluid dispenser with adjustable dosing.

FIG. 1 is a front perspective view of an example fluid dispenser 100 with adjustable dosing. Example fluid dispenser 100 may dispense any type of fluid, including but not limited to hand cleansers, liquid soaps, lotions, gels, foams, shampoos, hand creams, sanitizers, disinfectants, foams, detergents, bleaches, cleaning agents, laundry products, etc.

Example dispenser 100 includes a housing 110 having a front cover 102 and a back plate 104. Back plate 104 facilitates mounting of dispenser 100 to a wall or other object. In this example, housing 110 includes a hinge or hinges 112 which permit cover 102 to pivot between a closed position and an open position. A pushbar 106 permits a user to manually actuate dispenser 100, causing a quantity of fluid to be dispensed as indicated by arrow 108. In other examples, a different type of manual actuator may be used in place of pushbar 106. Alternatively, dispenser 100 may include a sensor that detects presence of a user's hands near the dispenser and automatically triggers an actuator to dispense a quantity of fluid in response to the detection.

In the example of a hand care dispenser, and soap dispensers are generally placed near sinks in kitchens, hospital rooms, restrooms, or other locations to facilitate hand washing by employees, members of the public, or other users. Depending upon the environment in which the dispenser is being used (e.g., a hospitality or restaurant location as opposed to a health care location), the type of fluid being dispensed, and/or the particular requirements of the organization or corporate entity, the desired amount of fluid product to be dispensed may differ. To that end, dispenser 100 is provided with an adjustable dosing mechanism that permits the dose to be adjusted to a desired setting.

Figure 2:
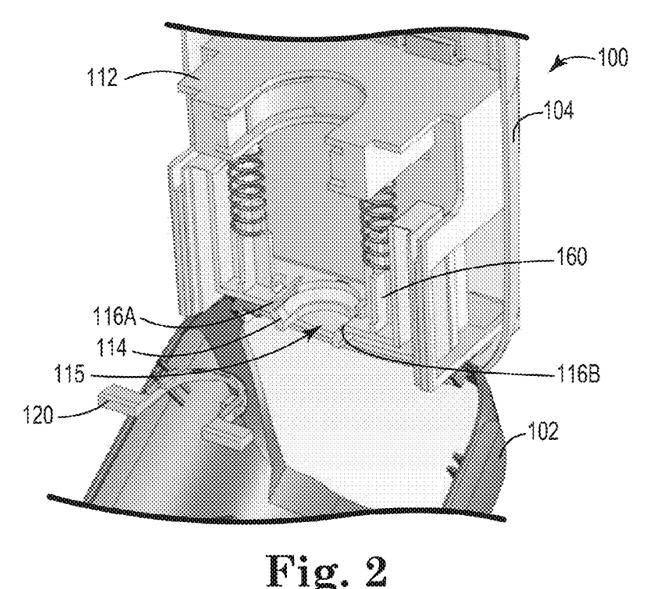
FIG. 2 is a perspective view of an example dispenser (cover open) and showing an example adjustable dosing mechanism.
Figure 3:
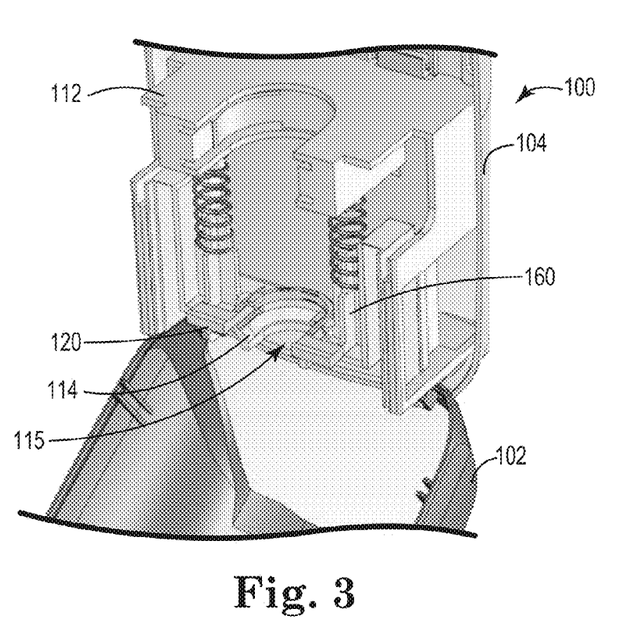
FIG. 3 is a perspective view of an example dispenser (cover open) having the adjustable dosing mechanism of FIG. 2 installed within the dispenser.

FIG. 2 is a perspective view of an example dispenser 100 (cover 102 open) and showing an example adjustable dosing mechanism 120 removed from the dispenser for purposes of the present description. FIG. 3 is a perspective view of an example dispenser 100 (cover 102 open) having the adjustable dosing mechanism 120 of FIG. 2 installed within the dispenser. Dispenser 100 includes an actuator 160 operatively connected to pushbar 106 (or other manual or automatic dispense actuator). In response to actuation of pushbar 106, actuator 160 operates to depress a pump (not shown in FIG. 2) as described further below causing a predetermined quantity of fluid to be dispensed from a fluid container (also not shown in FIG. 2). In this example, a pump support frame 114 having a pump receiving area 115 and slots 116A and 116B is sized to receive the adjustable dosing mechanism 120 as shown in FIG. 3.

Figure 4:
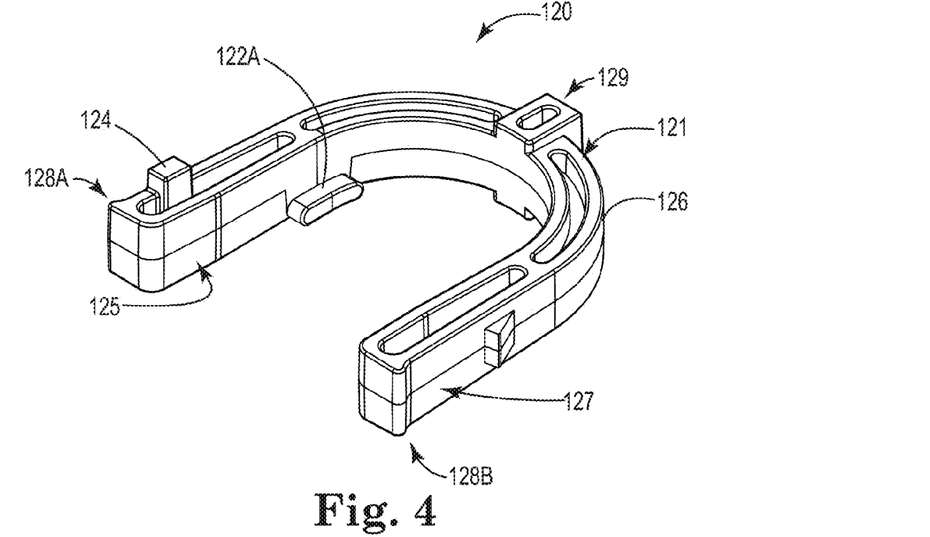
FIG. 4 is a perspective view of an example adjustable dosing mechanism from a high dose side.
Figure 5:
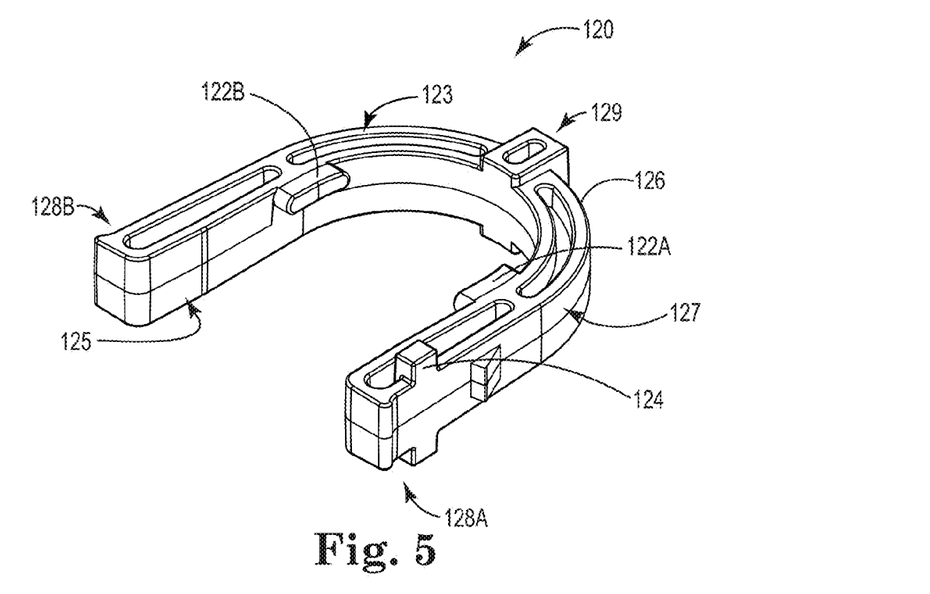
FIG. 5 is a perspective view of an example adjustable dosing mechanism from a low dose side.

FIG. 4 is a perspective view of an example adjustable dosing mechanism 120 in a high dose orientation. FIG. 5 is a perspective view of example adjustable dosing mechanism 120 in a low dose orientation. In this example, adjustable dosing mechanism 120 includes a generally horseshoe-shaped body 126 having a high dose surface 121, a low dose surface 123, an inner edge 125, and an outer edge 127. For purposes of the present description, the high dose orientation is defined as having the high dose surface 121 facing up, as shown in FIG. 4, and the low dose orientation is defined has having the low dose surface 123 facing up, as shown in FIG. 5. However, it shall be understood that these definitions are for purposes of description only, and that the disclosure it not limited in this respect.

Body 126 in this example further includes a pair of dose adjusting flanges 122A and 122B extending inwardly from the inner edge 125 of body 126. Flanges 122A and 122B are positioned on inner edge 126 relatively nearer the low dose surface 123 than the high dose surface 121. Thus, in the high dose orientation, flanges 122A and 122B are essentially positioned toward the downwardly facing side of adjustable dosing mechanism 120. In the low dose orientation, flanges 122A and 122B are essentially positioned toward the upwardly facing side of adjustable dosing mechanism 120. Although in this example a pair of dose adjusting flanges are shown, it shall be understood that the disclosure is not intended to be limited in this respect. For example, body 126 may include one or more dose adjusting flanges. As another example, a single dose adjusting flange or rim may extend around the inner edge of body 126 rather than two separate flanges. In addition, the one or more dose adjusting flanges may extend outwardly from the outer edge 127 rather than extending inwardly from the inner edge 125. Thus, many different examples of the adjustable dosing mechanism body 126, in addition to the specific examples shown in the Figures, are considered to be within the scope of the disclosure.

In this example, adjustable dispense mechanism body 126 further includes a toe portion 129 and a pair of laterally spaced heel portions 128A and 128B. A dosing indicator rib 124 may be positioned near one of the heel portions heel portion 128A in this example.

In other examples, dispense mechanism body 126 need not be horseshoe shaped. For example, dispense mechanism body 126 may be circular, elliptical, rectangular, square or virtually any other closed regular or irregular shape. In still other examples, in addition to the generally horseshoe shape shown in FIGS. 4 and 5, dispense mechanism body 126 may take virtually any other open-sided regular or irregular shape.

Figure 6:
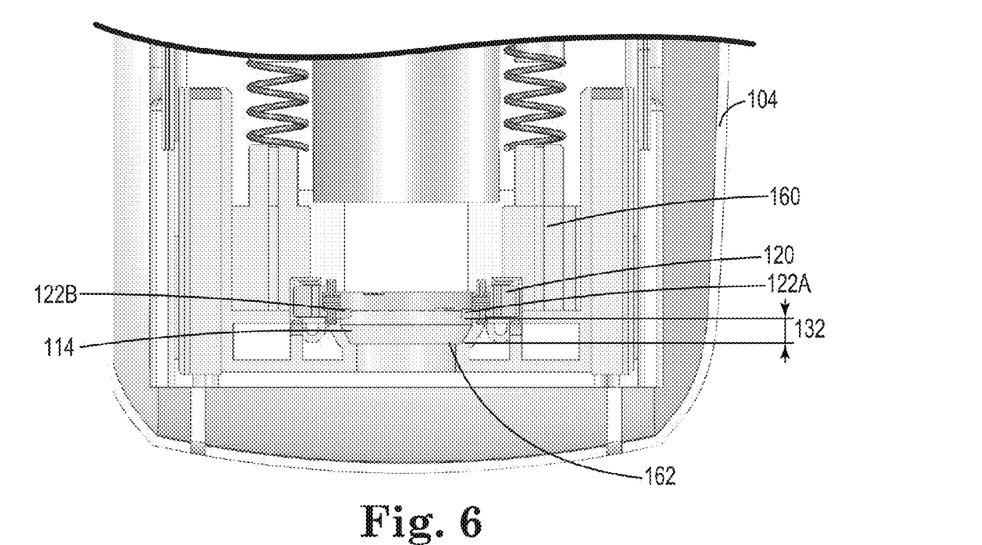
FIG. 6 is a front view of an example dispenser (no pump) with the cover removed and having an adjustable dosing mechanism installed in a high dose orientation.
Figure 7:
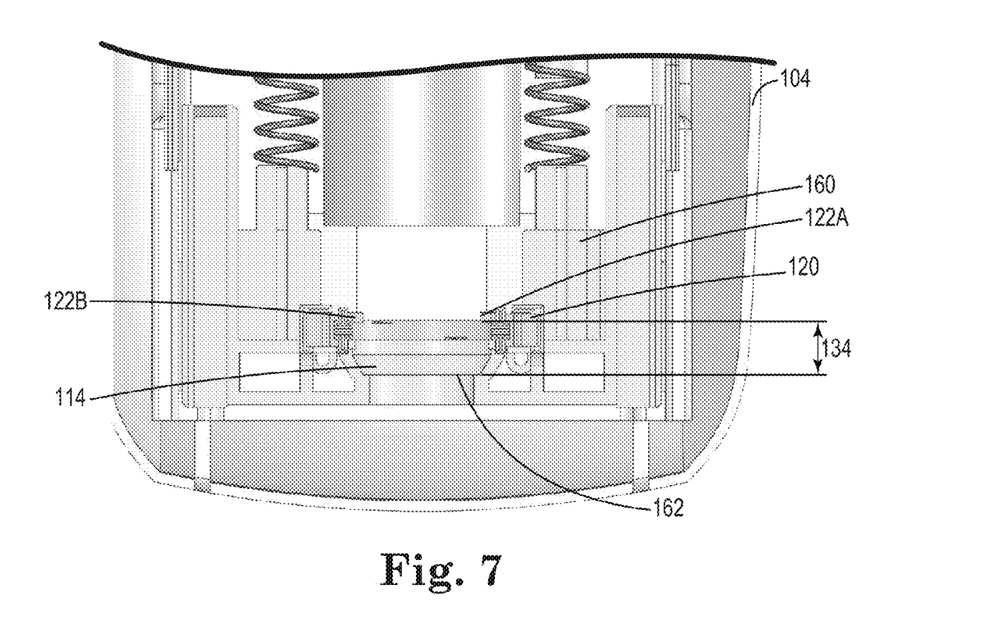
FIG. 7 is a front view of an example dispenser (no pump) with the cover removed and having an adjustable dosing mechanism installed in a low dose orientation.

FIG. 6 is a front view of an example dispenser with the cover removed and having an adjustable dosing mechanism 120 installed in a high dose orientation. FIG. 7 is a front view of an example dispenser with the cover removed and having an adjustable dosing mechanism 120 installed in a low dose orientation. For purposes of the present description, dispenser is shown without a pump in FIGS. 6 and 7. Frame 114 includes a lower engagement surface 162 against which a lower surface of a pump (not shown in FIGS. 6 and 7) engages when the dispenser is actuated. In the high dose orientation of FIG. 6, flanges 122A and 122B are positioned lower with respect to the dispenser than they are when in the low dose orientation of FIG. 7. This results in a gap 132 between the lower engagement surface 162 and the bottom of flanges 122A and 122B. In the low dose orientation of FIG. 7, flanges 122A and 122B are positioned higher with respect to the dispenser than they are when in the high dose orientation of FIG. 6. This results in a gap 134 between the lower engagement surface 162 and the bottom of flanges 122A and 122B. This difference in the distance between the bottom of flanges 122A and 122B and lower engagement surface 162, that is, the difference in the size of gap 132 as compared to the size of gap 134, accounts for a change in an amount of fluid dispensed when the adjustable dosing mechanism 120 is in the high dose orientation of FIG. 6 as compared to the low dose orientation of FIG. 7.

Figure 8:
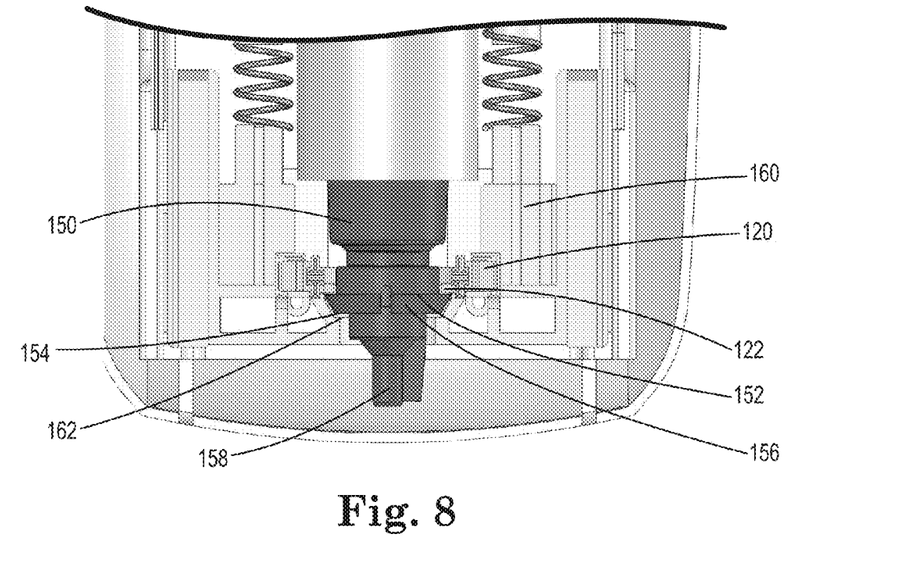
FIG. 8 is a front view of an example dispenser (pump included) with the cover removed and having an adjustable dosing mechanism installed in a high dose orientation with a dispense actuator in a released position.
Figure 9:
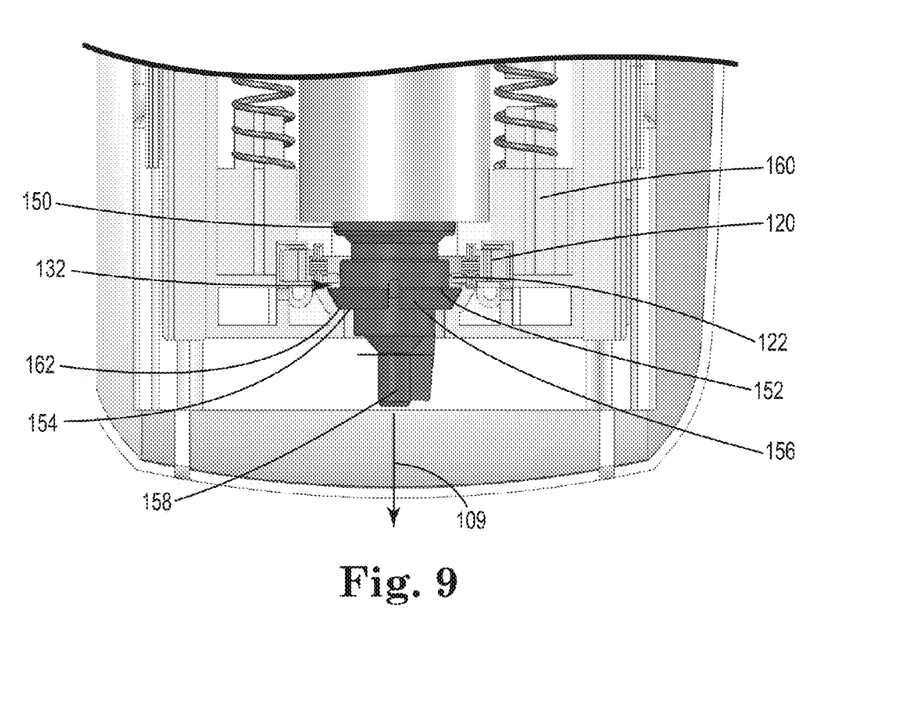
FIG. 9 is a front view of an example dispenser (pump included) with the cover removed having an adjustable dosing mechanism installed in a high dose orientation with a dispense actuator in a fully depressed position.

FIGS. 8 and 9 are front views of an example dispenser with the cover removed and having an adjustable dosing mechanism 120 installed in a high dose orientation. A pump 150 is also shown installed within the dispenser in both FIGS. 8 and 9. Pump 150 includes an engagement ring 156 having a top surface 152 and a bottom surface 154. Pump 150 also includes a nozzle 158 through which a fluid product is dispensed as indicated by arrow 109.

In some examples, pump 150 may be implemented using a pump designed to be fully depressed each time the pump is actuated for optimum performance. As will be explained in further detail below, the dispenser with adjustable dosing mechanism described herein permits a pump to be fully depressed in both a high dose mode and a low dose mode. As such, the dispenser with adjustable dosing mechanism described herein may be advantageous for pumps designed be fully depressed for optimum performance. However, it shall be understood that other types of pumps, including those that do not necessarily require the pump to be fully depressed, may also be used. Thus, in other examples, pump 150 may be implemented using any other type of pump. It shall therefore be understood that different types of pumps may be used, and that the disclosure is not limited in this respect.

In FIG. 8, dispense actuator 160 is in a fully released position, whereas in FIG. 9 dispense actuator 160 is in a fully engaged position (e.g., the dispensing actuator is fully depressed). In FIG. 8, when the dispenser actuator is released (either manually or automatically), actuator 160 moves downwardly such that bottom surfaces of engagement flanges 122A and 122B push downwardly against top surface 152 of engagement ring 156. When the dispenser is actuated (either manually or automatically) as shown in FIG. 9, actuator 160 moves upwardly such that lower engagement surface 162 pushes upwardly against bottom surface 154 of engagement ring 156. This actuates pump 150, resulting in a relatively higher dosage quantity of fluid product to be dispensed as indicated by arrow 109.

Figure 10:
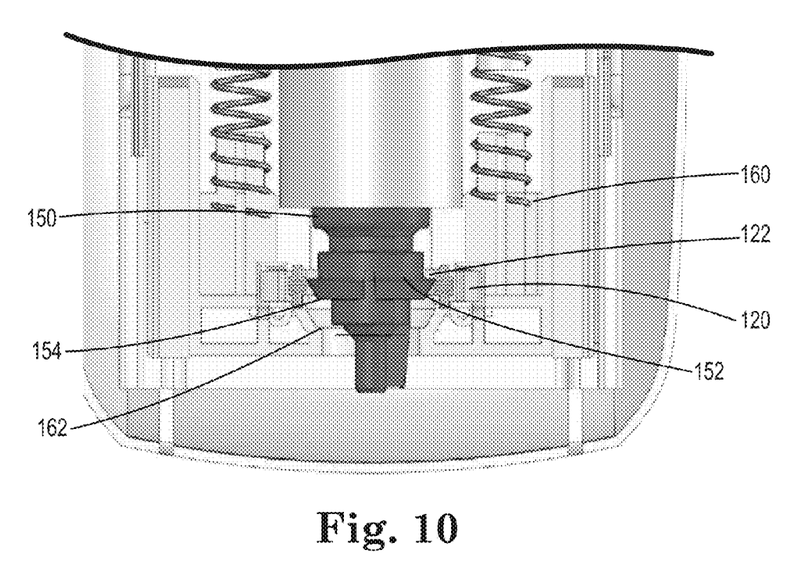
FIG. 10 is a front view of an example dispenser (pump included) with the cover removed and having an adjustable dosing mechanism installed in a low dose orientation with a dispense actuator in a released position.
Figure 11:
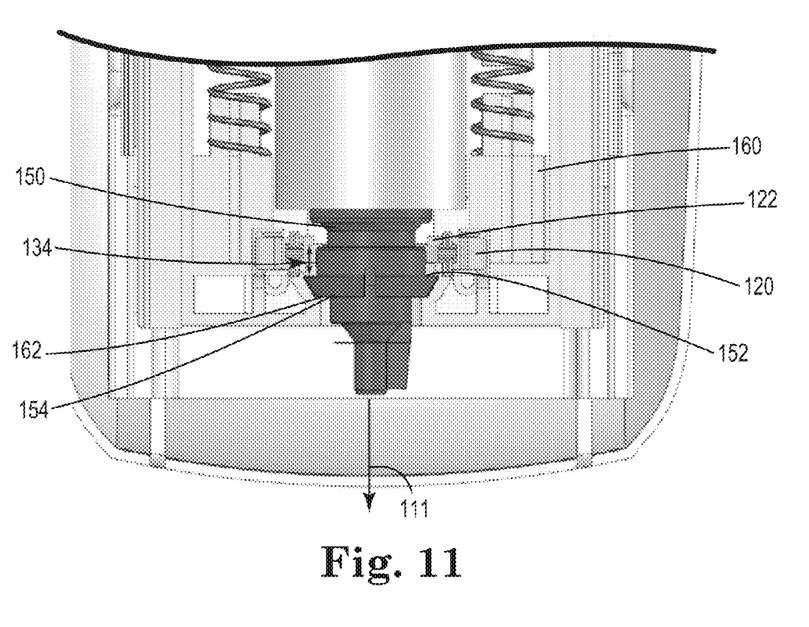
FIG. 11 is a front view of an example dispenser (pump included) with the cover removed and having an adjustable dosing mechanism installed in a low dose orientation with a dispense actuator in a fully depressed position.

FIGS. 10 and 11 are front views of an example dispenser with the cover removed and having an adjustable dosing mechanism 120 installed in a low dose orientation. Pump 150 is also shown installed within the dispenser in both FIGS. 10 and 11. In FIG. 10, dispense actuator 160 is in a fully released position, whereas in FIG. 11 dispense actuator 160 is in a fully engaged position (e.g., the dispensing actuator is fully depressed).

When the dispenser is actuated (either manually or automatically) as shown in FIG. 11, actuator 160 moves upwardly such that lower engagement surface 162 pushes upwardly against bottom surface 154 of engagement ring 156. This actuates pump 150, resulting in a relatively lower dosage quantity of fluid product to be dispensed (as compared to the relatively higher dosage dispensed in the high dose mode shown in FIGS. 8 and 9) as indicated by arrow 111.

In FIG. 10, when the dispenser actuator is released (either manually or automatically), actuator 160 moves downwardly such that bottom surfaces of engagement flanges 122A and 122B push downwardly against top surface 152 of engagement ring 156. However, top surface of engagement ring 154 will not come into contact with flanges 122A and 122B until the travel distance indicated by gap 134 is traversed. In general, the size of gap 134 in the low dose configuration is greater than the size of gap 132 in the high dose configuration shown in FIGS. 8 and 9. The result of the larger gap size 134 in the low dose configuration is that less fluid product is drawn into pump 150 for the next dispense cycle in the low dose configuration. In this way, a relatively lower dosage quantity of fluid product is dispensed in the low dose configuration as indicated by arrow 111. In addition, during each dispense in both the high dose and the low dose configuration, the actuator 160 is depressed or engaged to its full extent as defined by lower engagement surface 162.

Because the gap 134 provided in the low dose orientation is larger than the gap 132 provided in the high dose orientation, the amount of fluid product drawn into pump 150 is relatively larger in the high dose orientation of FIGS. 8 and 9 than in the low dose orientation of FIGS. 10 and 11. Again, this is due to the fact that the upper surface 152 of engagement ring 156 contacts flanges 122A and 122B at an earlier point in time during the release of the actuator in the high dose orientation than it does in the low dose orientation, thus causing relatively more fluid product to be drawn into pump 150 as compared to the low dose orientation.

The size of gaps 132 and/or 134 may be adjusted to provide for the desired quantity of fluid product to be dispensed in the high and/or low dosage orientations. For example, the high dose orientation may provide for a dose of 1.5 milliliters (ml) of a liquid, while the low dose orientation may provide for a dose of 1.0 milliliters (ml) of the liquid. As another example, the high dose orientation may provide for a dose of 1.0 milliliters (ml) of a foam, while the low dose orientation may provide for a dose of 0.7 milliliters (ml) of the foam. It shall be understood, however, that these absolute and relative dosage quantities are for purposes of example only, and that the disclosure is not limited in this respect.

In FIGS. 8-11, dispense mechanism body 126 is of the generally horseshoe-shape shown in more detail in FIGS. 4 and 5. However, any open or closed shape may be substituted, and the disclosure is not limited in this respect. A dispense mechanism body having an open-sided regular or irregular shape may permit a pump to be installed in the dispenser from a generally horizontal direction. In the example of a dispense mechanism body having a closed regular or irregular shape, a pump may be installed in a somewhat more vertical direction (e.g., from above in the examples shown in FIGS. 8-11). Thus, although specific examples of a dispense mechanism body 126 are shown and described herein, it shall be understood that any size or shaped dispense mechanism body capable of providing the adjustable dosing feature as described herein may be substituted for the specific examples presented without departing from the spirit and scope of the present disclosure.

The dispenser with adjustable dosage mechanism described herein may provide several advantages. For example, the designs described herein do not limit travel distance of a manual pushbar. This may provide for a more positive user experience than when travel distance of the pushbar is limited to provide for a lower dose. As another example, maintaining the lower engagement surface 162 in both the high and low dose orientations means that the pump 150 is fully depressed regardless of which orientation the dispenser is placed. This may be an advantage for certain types of pumps that prefer to be fully depressed each time they are actuated.

Maintaining the lower engagement surface 162 in both the high and low dose orientations also results in the actuator returning to its lowest position regardless of whether the dispenser is in the high or low dose orientation. This, in turn, may assist with alignment of the pump and actuator regardless of the dose setting so that the pump may be removed and re-installed in the dispenser without requiring cumbersome manual manipulation of the dispenser mechanism.

Figure 12:
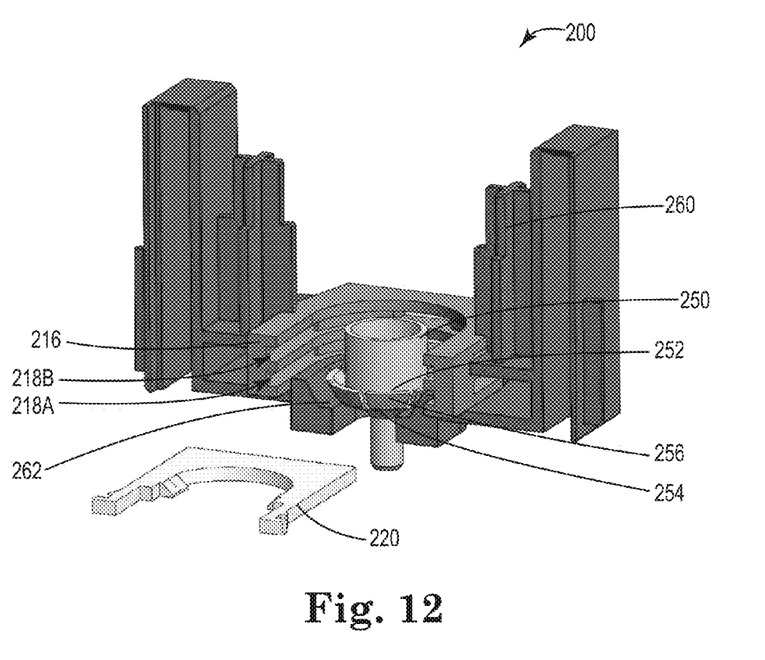
FIG. 12 is a perspective view of an alternative adjustable dosing mechanism.

FIG. 12 is a perspective interior view of a portion of a dispenser 200 and also showing an alternative adjustable dosing mechanism 220. Dispenser 200 includes a adjustable dosing frame 216 having at least two slots 218 sized to receive adjustable dosing mechanism 220. In this example, frame 216 includes two slots, a high dose slot 218A and a low dose slot 218B. Dispenser 200 further includes a lower pump engagement surface 262. A pump 250 includes an engagement ring 256 having an upper surface 252 and a lower surface 254.

Figure 13:
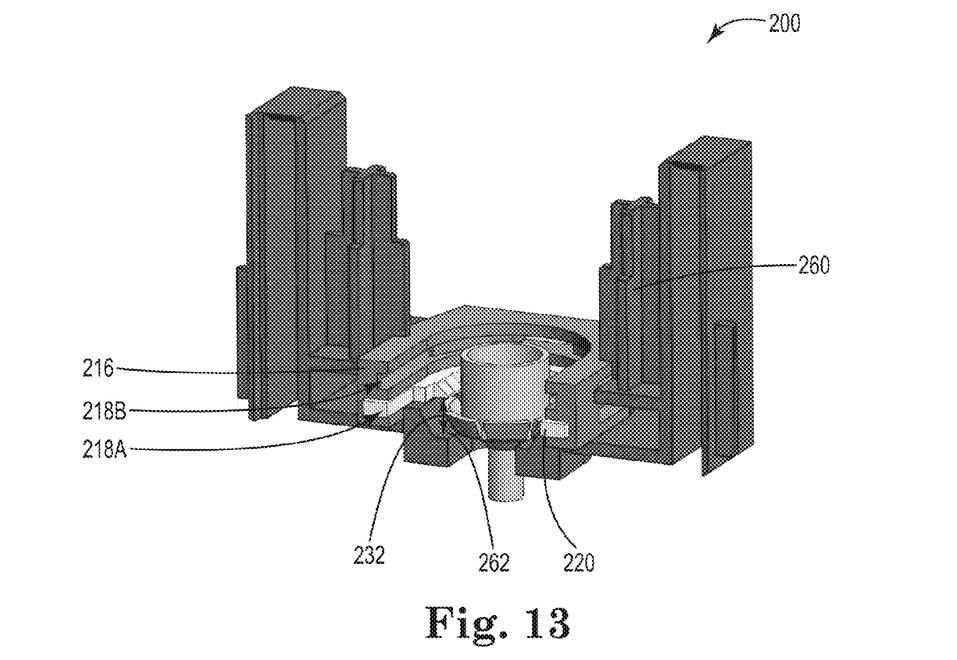
FIG. 13 is a perspective view of an alternative adjustable dosing mechanism installed in a high dose position.
Figure 14:
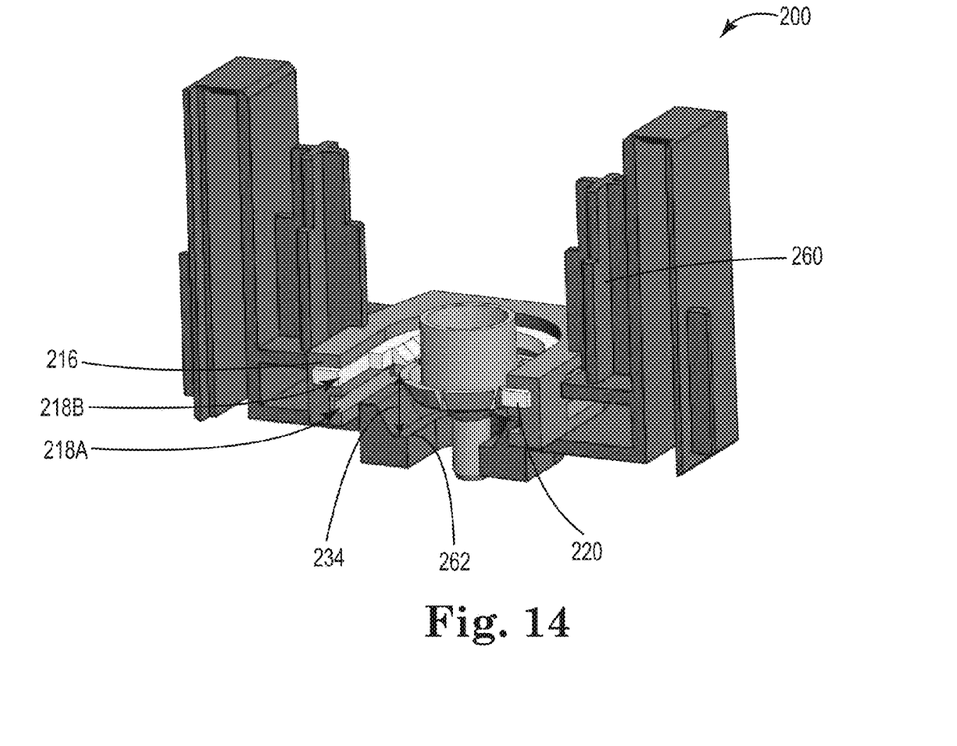
FIG. 14 is a perspective view of the alternative adjustable dosing mechanism installed in a low dose position.

FIG. 13 is a perspective view of adjustable dosing mechanism 220 of FIG. 12 installed in a dispenser in a high dose configuration. In other words, in FIG. 13, mechanism 220 is installed in high dose slot 218A. FIG. 14 is a perspective view of adjustable dosing mechanism 220 installed in a low dose configuration. In other words, in FIG. 14, mechanism 220 is installed in low dose slot 218B. When in the high dose configuration of FIG. 13, a gap 232 is provided between a lower surface of adjustable dosing mechanism 220 and the lower engagement surface 262. When in the low dose configuration of FIG. 14, a gap 234 is provided between a lower surface of adjustable dosing mechanism 220 and the lower engagement surface 262.

Similarly to that described above with respect to FIGS. 8-11, in both the high dose configuration of FIG. 13 and in the low dose configuration of FIG. 14, when the dispenser is actuated (either manually or automatically) actuator 260 moves in a generally upward direction such that lower engagement surface pushes against bottom surface 254 of engagement ring 256. In the high dose configuration of FIG. 13, the size of gap 232 is relatively smaller than the size of gap 134 in the low dose configuration of FIG. 14. As a result, relatively less fluid product is drawn into pump 250 in the low dose configuration as compared to the amount of fluid product drawn into pump 250 in the high dose configuration. In this way, a relatively lower dose of fluid product will be dispensed when adjustable dosing mechanism is positioned in the low dose slot 218B as compared to the high dose slot 218A. However, during each dispense, the actuator 260 is depressed or engaged to its full extent as defined by lower engagement surface 262 regardless of whether the mechanism 220 is positioned in the low dose or the high dose configuration.

Because the gap 234 provided in the low dose orientation of FIG. 14 is larger than the gap 232 provided in the high dose orientation of FIG. 13, the amount of fluid product drawn into pump 250 is relatively larger in the high dose orientation than in the low dose orientation. Again, this is due to the fact that the upper surface 252 of engagement ring 256 contacts the lower surface of mechanism 220 at an earlier point in time during the release of the actuator in the high dose orientation than it does in the low dose orientation, thus causing relatively more fluid product to be drawn into pump 250 as compared to the low dose orientation.

Figure 15:
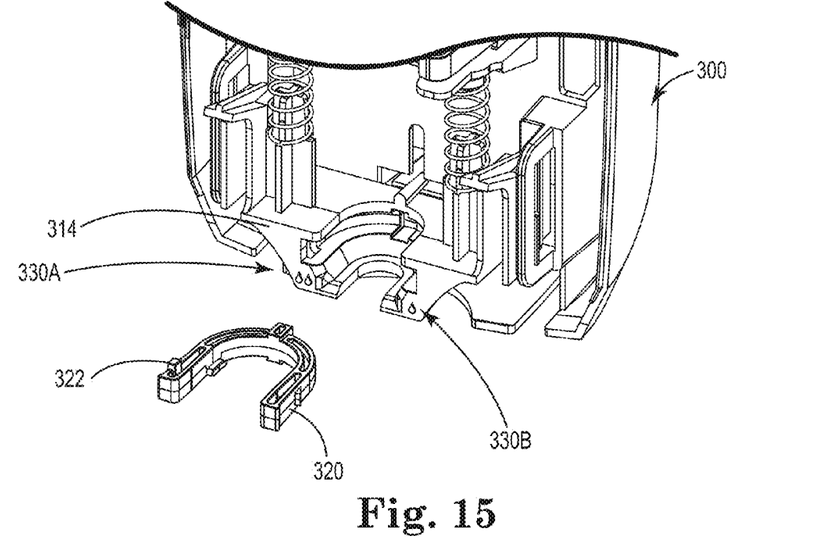
FIG. 15 is a perspective interior view of another example dispenser having adjustable dosing capabilities.
Figure 16:
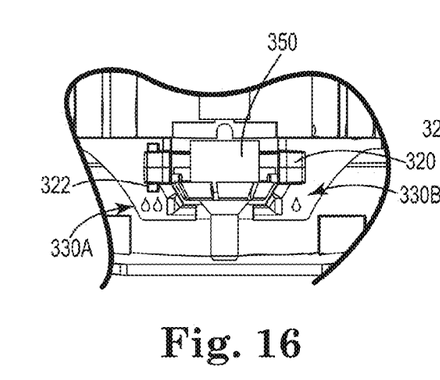
FIG. 16 is a front interior view of the dispenser of FIG. 15 with an adjustable dosing mechanism body received in a high dose orientation.
Figure 17:
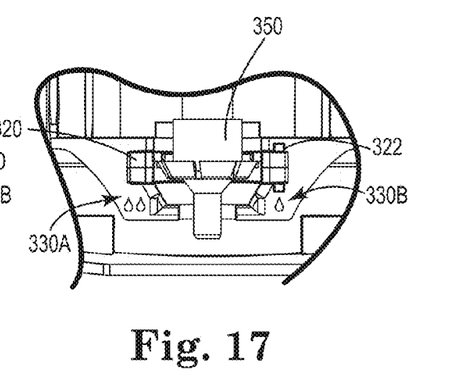
FIG. 17 is a front interior view of the dispenser of FIG. 15 with an adjustable dosing mechanism body received in a low dose orientation.

FIG. 15 is a perspective interior view of another example dispenser 300 having adjustable dosing capabilities. In this example, adjustable dosing mechanism 320 includes a dose indicator rib 322. A dose adjuster receiving frame 314 includes a high dose indicator 330A and a low dose indicator 330B. As shown in FIG. 16, dose indicator rib 322 aligns with the high dose indicator 330A when the adjustable dosing mechanism body 320 is received into the adjustable dosing mechanism receiving area in the high dose orientation. Similarly, as shown in FIG. 17, dose indicator rib 322 aligns with low dose indicator 330B when the adjustable dosing mechanism body 320 is received into the adjustable dosing mechanism receiving area in the low dose orientation. In this way, a user may visually determine whether the adjustable dosing mechanism body is installed in the high or low dose orientation. The user may then remove and re-install the adjustable dosing mechanism body in the event that it was not initially installed in the desired orientation.

The examples shown and described herein illustrate that adjustment of a gap, or distance, between a lower engagement surface of a dispenser and a bottom surface of an adjustable dosing mechanism has the effect of adjusting the relative amount of product dispensed. A relatively smaller gap, or distance, means that relatively more product is drawn into the pump for subsequent dispensing. A relatively larger gap, or distance, means that relatively less product is drawn into the pump for subsequent dispensing. Thus, it shall be understood that any implementation in which this gap or distance is adjusted to provide a dispenser with adjustable dosing is intended to be within the scope of the present disclosure, and that the specific examples shown and described herein are for example purposes only, and that the disclosure is not limited in this respect.

In addition, although the examples shown and described herein include high and low dose configurations, it is to be understood that other implementations are appreciated in which three or more dosing options may be provided. For example, in the examples described with respect to FIGS. 2-11, additional adjustable dosing mechanism having differing thickness or differing placement of the flanges may be included to result in three or more differently sized gaps. As another example, with respect to FIGS. 12-14, a dispenser may include a frame 216 having three or more slots 218, each providing a different dosing level. Thus, many alternatives to the dispensers with adjustable dosing mechanisms are intended to be included within the scope of the present disclosure.

Various examples have been described. These and other examples are within the scope of the following claims.

The invention claimed is:

1. A dispenser comprising:
a housing;
a container inside of the housing having a supply of fluid to be dispensed;
a dispensing actuator that when actuated results in a quantity of the fluid being dispensed from the container; and
an adjustable dosing mechanism body comprising a high dose surface, a low dose surface, an inner edge and an outer edge, the body further including one or more dose adjusting flanges positioned relatively nearer the low dose surface than the high dose surface;
the housing further including an adjustable dosing mechanism receiving area positioned inside of the housing and sized to receive the adjustable dosing mechanism body in either a high dose orientation or a low dose orientation;
the housing further including a pump engagement surface such that when the adjustable dosing mechanism body is received into the adjustable dosing mechanism receiving area in the high dose orientation, the dose adjusting flanges are positioned relatively nearer to the pump engagement surface,
such that when the adjustable dosing mechanism body is received into the adjustable dosing mechanism receiving area in the high dose orientation, a relatively larger quantity of fluid product is drawn into a pump for subsequent dispensing, and when the adjustable dosing mechanism body is received into the adjustable dosing mechanism receiving area in the low dose orientation, a relatively smaller quantity of fluid product is drawn into the pump for subsequent dispensing.

2. The dispenser of claim 1 wherein the adjustable dosing mechanism body comprises a generally horseshoe-shaped body.

3. The dispenser of claim 2, wherein the generally horseshoe-shaped body further includes a toe portion and a pair of laterally spaced heel portions.

4. The dispenser of claim 1 wherein the adjustable dosing mechanism body further includes a dose indicator rib.

5. The dispenser of claim 4 wherein the housing further includes a high dose indicator and a low dose indicator, and wherein the dose indicator rib aligns with the high dose indicator when the adjustable dosing mechanism body is received into the adjustable dosing mechanism receiving area in the high dose orientation, and the dose indicator rib aligns with the low dose indicator when the adjustable dosing mechanism body is received into the adjustable dosing mechanism receiving area in the low dose orientation.

6. The dispenser of claim 1 wherein the adjustable dosing mechanism body comprises one of a closed regular or a closed irregular shape.

7. The dispenser of claim 1 wherein the adjustable dosing mechanism body comprises one of an open-sided regular or an open-sided irregular shape.

8. The dispenser of claim 1, wherein the adjustable dosing mechanism receiving area further includes slots sized to receive the adjustable dosing mechanism body.

9. The dispenser of claim 1 wherein when the adjustable dosing mechanism body is received into the adjustable dosing mechanism receiving area in the low dose orientation, the dose adjusting flanges are positioned relatively farther from the pump engagement surface.

10. The dispenser of claim 1 wherein the one or more dose adjusting flanges includes a pair of dose adjusting flanges extending inwardly from the inner edge of the body member.

11. The dispenser of claim 1 wherein a dispensing actuator is manually actuated by a user.

12. The dispenser of claim 1 wherein the dispensing actuator is automatically actuated by sensing presence of a user.

13. A dispenser that contains a supply of a fluid to be dispensed, comprising:
   a housing;
   a dispensing actuator that when actuated results in a quantity of the fluid being dispensed; and
   an adjustable dosing mechanism body comprising a high dose surface and a low dose surface, the body further including one or more dose adjusting flanges positioned relatively nearer the low dose surface than the high dose surface;
   the housing further including a receiving area positioned inside of the housing and sized to receive the adjustable dosing mechanism body in either a high dose orientation or a low dose orientation;
   the housing further including a pump engagement surface such that when the adjustable dosing mechanism body is received into the receiving area in the high dose orientation, the dose adjusting flanges are positioned relatively nearer to the pump engagement surface,
   such that when the adjustable dosing mechanism body is received into the adjustable dosing mechanism receiving area in the high dose orientation, a relatively larger quantity of fluid product is drawn into a pump upon actuation of the dispensing actuator, and when the adjustable dosing mechanism body is received into the adjustable dosing mechanism receiving area in the low dose orientation, a relatively smaller quantity of fluid product is drawn into the pump upon actuation of the dispensing actuator.

14. The dispenser of claim 13 wherein the fluid to be dispensed is one of a liquid, a foam, or a gel.

15. The dispenser of claim 13 wherein the adjustable dosing mechanism body comprises a generally horseshoe-shaped body.

16. The dispenser of claim 15, wherein the generally horseshoe-shaped body further includes a toe portion and a pair of laterally spaced heel portions.

17. The dispenser of claim 13 wherein the adjustable dosing mechanism body comprises one of a closed regular or a closed irregular shape.

18. The dispenser of claim 13 wherein the adjustable dosing mechanism body comprises one of an open-sided regular or an open-sided irregular shape.

19. The dispenser of claim 13, wherein the adjustable dosing mechanism receiving area further includes slots sized to receive the adjustable dosing mechanism body.

20. The dispenser of claim 13 when the adjustable dosing mechanism body is received into the adjustable dosing mechanism receiving area in the low dose orientation, the dose adjusting flanges are positioned relatively farther from the pump engagement surface.

* * * * *